Aug. 20, 1957   H. F. SCHNEIDER ET AL   2,803,341
METAL DETECTING DEVICE
Filed Dec. 21, 1953   2 Sheets-Sheet 2

INVENTORS
HELMUTH F. SCHNEIDER
& WILLIAM M. ADELMAN
BY
ATTORNEY

United States Patent Office 2,803,341
Patented Aug. 20, 1957

2,803,341

METAL DETECTING DEVICE

Helmuth F. Schneider, Westville, and William M. Adelman, Pennsauken, N. J., assignors to Radio Corporation of America, a corporation of Delaware Application December 21, 1953, Serial No. 399,278

8 Claims. (Cl. 209—81)

This invention relates to metal detectors, and more particularly to automatic means for continuously inspecting non-metallic packages for the presence of desired metal objects in the package contents.

Electronic metal detecting devices are well-known in the art. Most of the devices in present day use are designed primarily to indicate the presence of contaminating material in nonmetallic materials. A particularly useful type of metal detector is one which detects the absence of metal in a pacakage or component.

There are numerous industrial applications for a metal detector which will detect the absence of metal within a package or an object. For example, surgical compresses packaged with safety pins for field use may be inspected to assure the presence of the safety pins. Disposable plastic syringes may be inspected to assure the presence of the syringe needles. Home permanent wave kits may be inspected to assure the presence of a neutralizing chemical packaged in a metal foil. Soap powder packaged with a hand towel may be inspected to assure the presence of the hand towel, if the latter is marked with a metal foil wrapper. There are numerous other industrial applications for a metal detector device to detect the absence of metal.

Heretofore, many of the metal detectors which have been used to detect the absence of metal have been limited in their use, since they fail to differentiate between a nonmetallic material and no material at all.

It is an object of this invention to provide an improved metal detector, to detect the absence of metal, that will differentiate between the absence of metal in material and no material at all.

Other metal detector devices are used to separate packages containing metal from those not containing such metal and effectively search for metal, rather than the absence of metal. These metal detectors actuate various circuits and relays as each package containing the metal is inspected. However, the operation of such circuits and relays often limits the inspection rate to the reset speed of the material detector and also greatly reduces the useful life of the reject relays. These inherent limitations have kept the advantage of content inspection applications from the mass producers of packaged goods.

It is, therefore, a further object of this invention to provide a simple and inexpensive metal detector which will essentially search for the absence of metal and actuate its relays and relay circuits only upon the detection of an improperly filled package.

Very often, in mass production content inspection systems, it is desirable to maintain a predetermined spacing between the packages to be inspected. Such spacing may be necessary to provide sufficient time to permit proper operation of the metal detecting system.

It is, therefore, a further object of this invention to provide an improved metal detector which will respond to improper spacing between packaged material carried by a conveyor belt or other movable means.

In accordance with this invention, a metal detector is adapted to receive packages moved by a conveyor belt. The metal detector responds to the presence of metal by means of a positive pulse in its output circuit. Upon the application of the positive pulse to the grid of a thyratron, a point of reference potential, which is the plate voltage of the thyratron, varies from a relatively fixed value to a lower value. Ionization of the thyratron maintains the plate potential at its lower value. A protective relay is normally operative to actuate a pair of contacts to close a circuit to permit movement of the conveyor belt. A switch, normally open, is disposed to be closed by a package moved by the conveyor belt before the package enters into a head of the metal detector unit. This normally open switch connects the protective relay to the reference potential point. This causes the protective relay to become inoperative when the reference potential is at a lower value, thereby affecting a control means to stop the conveyor belt or to actuate a reject device. If however, the reference potential is at its relatively high fixed value, the closing of the switch will not effect the operation of the protective relay the control means is not affected and the conveyor belt continues to move or the reject device remains inactive. A reject relay is normally in its inoperative position. A second switch is disposed to be closed by a package carried by the conveyor belt after it has left the metal detector. This switch connects the reject relay to the source of operating potential. When energized, the reject relay actuates the control means which controls the movement of the conveyor belt or reject device. The conveyor is stopped or the reject device is actuated when the reference potential is relatively high. If the reference potential is low, the reject relay will remain inoperative and the conveyor belt continues to move or the reject device remains inactive. A final switch, normally closed, is disposed to be opened by a package carried by the conveyor belt after it has passed the second switch. This switch opens the plate circuit and deionizes the thyraton, thereby restoring the thyratron plate voltage to its fixed value.

Objects and advantages of the present invention, other than those set forth above, will, of course, become apparent and immediately suggest themselves to those skilled in the art to which the invention is directed from a reading of the following specification in connection with the accompanying drawing in which.

Figure 1:
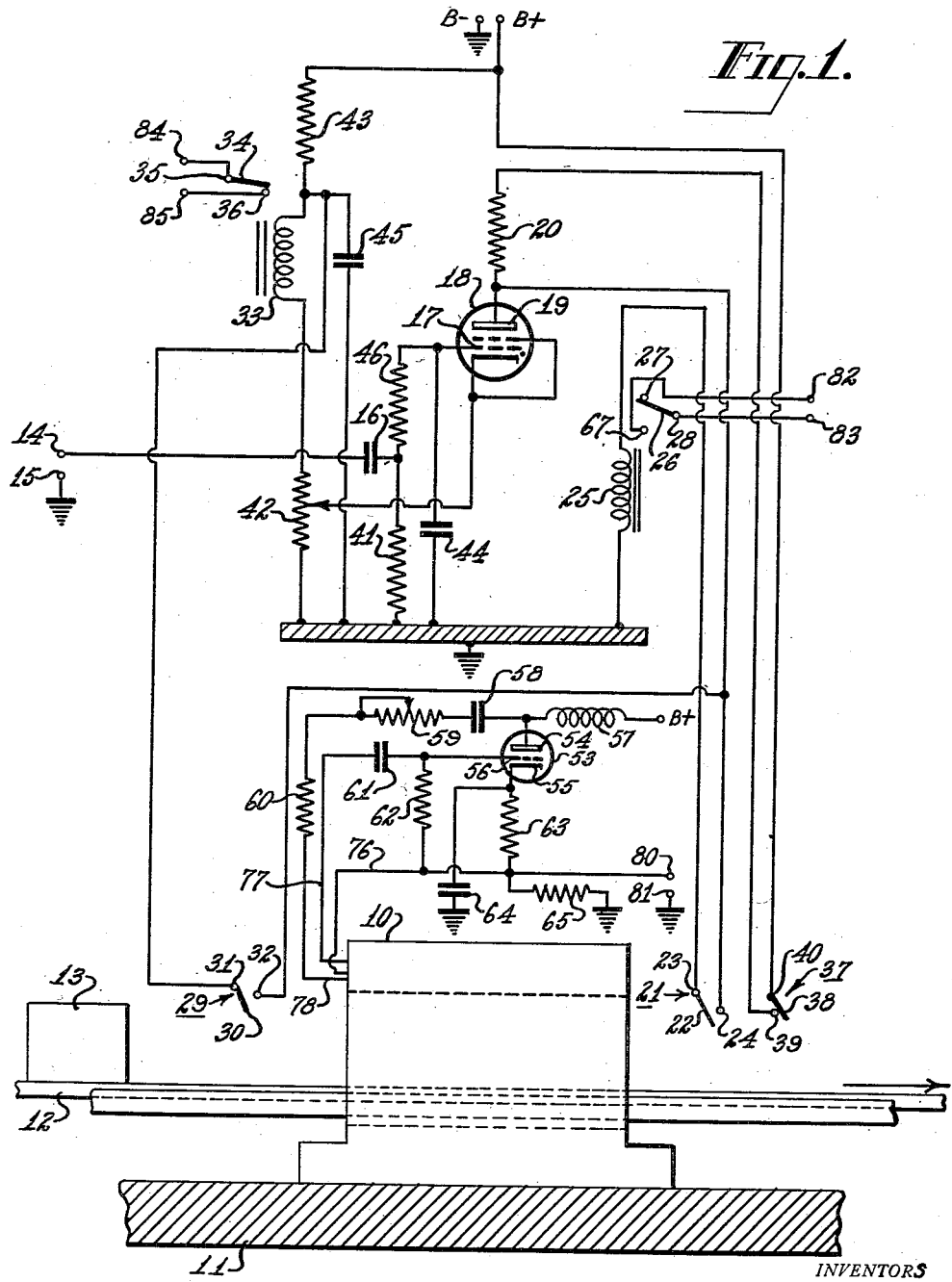
Figure 1 is a schematic showing of an illustrative embodiment of the invention.

Referring particularly to Figure 1 of the drawing, there is shown a metal detector inspection head 10 on a support 11. The inspection head has an aperture to permit a conveyor belt 12 to move therethrough. A work-piece such as a package 13, entering the inspection head through an inlet aperture, produces a positive output pulse in a metal detector (not shown) when the package contains a certain required metal content. The positive pulse is applied to a pair of input terminals 14 and 15 and coupled through a capacitor 16 and a resistor 46 to the grid 17 of the thyratron tube 18. This positive pulse causes current to flow in the thyratron resulting in ionization of the gas within the tube. The current flow reduces the voltage on the plate 19, due to the voltage drop across a plate load resistor 20, from approximately 300 volts to slightly more than the deionization voltage of the thyratron gas, which is approximately 10 volts.

The positive pulse to be applied to the thyratron may be generated by a circuit that includes a modified Hartley oscillator whose tank coil 50 forms part of the inspection aperture of the metal detector. The circuit within the inspection head, consisting of a tuned center-tapped tank coil 50 and a capacitor 51 is illustrated in detail in Figure 2. The package 13 containing a metal content 73 is shown as it enters the aperture in the direction of the arrow.

Figure 2:
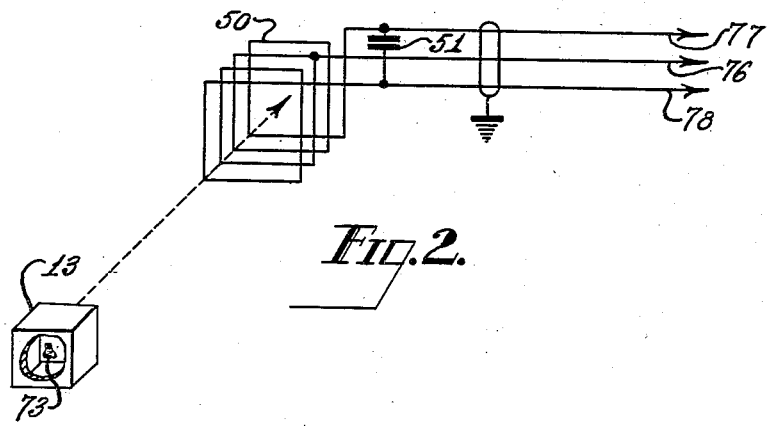
Figure 2 is a schematic showing of the circuit within the metal detector head appearing in Figure 1.

The Hartley oscillator comprises a vacuum tube 53 having an anode 54, a cathode 55 and a control grid 56. The oscillator tube derives its B+ voltage through an R. F. choke 57. The anode is coupled to one end of the metal detector tank coil 50 through a D. C. blocking capacitor 58, a variable R. F. feedback resistor 59 and a fixed R. F. resistor 60. A capacitor 51 tunes the tank coil 50 to a desired frequency and is shown in Figure 2.

A coupling capacitor 61 is connected from one end of the tank coil to the grid 56 and a grid leak resistor 62 is connected between the grid 56 and cathode 55. A resistor 63 provides means for self-biasing the oscillator tube and a capacitor 64 provides a signal by-pass path. A resistor 65 provides a load across which a voltage is developed to be applied to the input circuit of the thyratron tube. The conductors 78, 76 and 77 connect the tank coil within the inspection aperture to the circuits associated with the oscillator tube.

When a conductive or metallic particle passes through the tank coil of a stable oscillator, the "Q" of the tank is reduced due to the introduction therein of hysteresis or eddy current losses. This results in a current change in the oscillator circuit and a change in the voltage drop across the load resistor 65. The voltage change or signal is fed from terminals 80 and 81 to the input terminals 14 and 15 of the thyratron control tube. This positive pulse is then fed to the control electrode 17 through the capacitor 16 causing the thyratron to fire. The voltage applied to the grid of the thyratron should be a positive pulse. If an output pulse from a metal detector is negative, a phase inversion circuit may be employed to attain a pulse of the proper polarity.

The thyratron plate voltage, which constitutes the reference voltage for the system, is at 300 volts when one of the following conditions exist: when no package has passed through the inlet and outlet apertures of the metal detector head, the inspected package or object does not contain the desired metal, or the metal detecting device has lost its sensitivity.

Differentiation between the first two conditions is obtained by means of the normally open microswitch 21, which is closed when a package leaves the inspection aperture and moves the arm 22 to close the contacts 23 and 24. When the contacts are closed, a reject relay 25 is connected to the reference potential. Since the thyratron is not ionized, the reference potential is at 300 volts and will energize the reject relay. Energization of the reject relay is used to actuate the arm 26 away from a contact 27 to electrically disconnect the contacts 27 and 28. These contacts are connected to a pair of terminals 82 and 83, which in turn may be connected to either stop the conveyor belt or to actuate a reject device to discard the improperly filled package. This provides means for identifying a work piece failing to produce an electrical impulse. If the metal detector has lost its sensitivity, all the packages, whether properly filled or not, will be rejected or result in stoppage of the conveyor belt, since the reference potential of 300 volts will actuate the reject relay. There is thus provided a positive safeguard against the passage of packages which have not been inspected for the presence of metal by the metal detector device.

The reference potential at the plate of the thyratron is at approximately 10 volts when a package containing the desired metal has passed through the inspection aperture of the metal detector head or the thyratron plate voltage has not been reset either due to a failure in the equipment or because the spacing between the packages on the inspection conveyor has been reduced to less than the minimum distance required for resetting. Such a resetting of the thyratron reference voltage will be described subsequently.

Differentiation between the conditions where a package containing the desired metal has passed through the inspection aperture and when the thyratron has not been reset from 10 to 300 volts is obtained by means of the normally open microswitch 29. This switch is closed by a package urging an arm 30 to electrically close a pair of contacts 31 and 32 prior to the package entering the inspection aperture. When the switch 29 is closed, the protective relay 33 is connected to the reference potential at the plate of the thyratron. This voltage, when it is at 10 volts, deenergizes the protective relay causing an arm 34 to be released to open a pair of contacts 35 and 36. These contacts are connected to a pair of output terminals 84 and 85, which may be used to control a circuit to stop the conveyor belt or to actuate a rejection device to discard a package or object from the belt, as will be subsequently described.

When the thyratron has not been reset either due to a failure in the equipment or because the spacing between the packages on the inspection conveyor has been reduced to less than the minimum distance required for reset, the inspection process is stopped by preventing a new package, either properly filled or not, from entering the aperture. When a package containing the desired metal has passed through the inspection aperture, the normally open contacts 23 and 24 of the switch 21 are closed by the package contacting the arm 22. The reject relay 25 is then connected to the reference potential. The reference potential, being at 10 volts, is too low to actuate the reject relay, and thus rejection does not take place. The package is, therefore, accepted.

A reset microswitch 37 is normally closed to connect the plate of the thyratron to B+, shown here as being 300 volts. When the switch 37 is opened by a package moving a contact arm 38 to disconnect a contact 39 from a contact 40 after the package has left the aperture of the metal detector head, a positive potential of 300 volts is momentarily removed from the thyratron. The removal of this potential deionizes the thyratron and thereby resets the plate voltage from 10 volts to 300 volts.

A grid leak for the input circuit of the thyratron is provided by a resistor 41. A potentiometer 42 is a sensitivity control and determines the firing point of the thyratron. The current through the relay 33 is limited by a resistor 43. A transient by-pass capacitor 44 is provided to prevent the thyratron from being fired by any impulses other than the pulse from the metal detector. A transient by-pass capacitor 45 is provided to prevent sudden surges of current from passing to the source of power when the relay 33 is suddenly deenergized.

Figure 3:
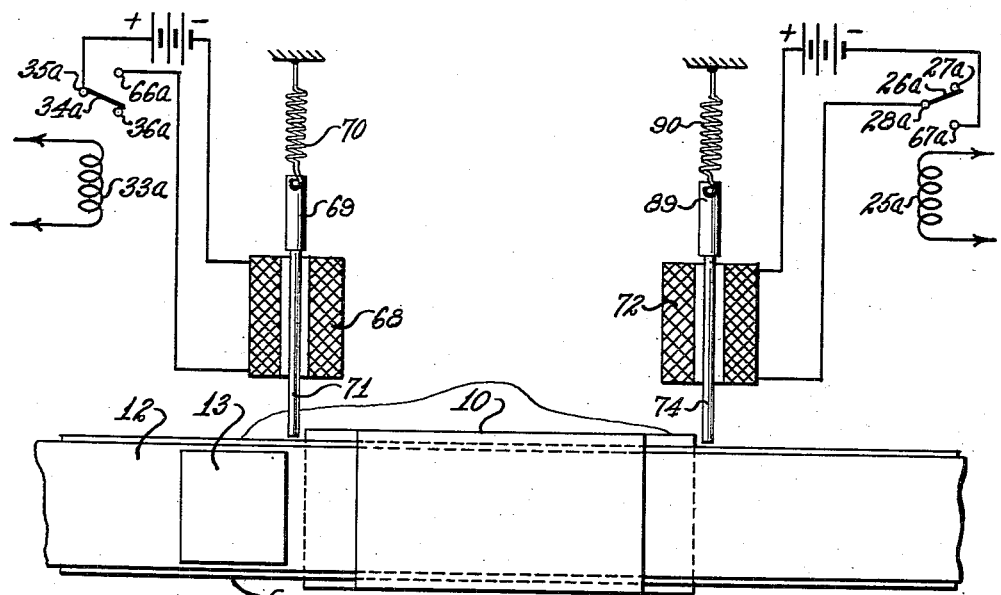
Figure 3 is a schematic showing of a form of control means useable in the embodiment of Figure 1.

Referring particularly to Figure 3, the control means heretofore mentioned are shown as operating reject devices. The current through the protective relay 33a normally attracts the arm 34a to maintain the contacts 35a and 36a in a closed position. A solenoid winding 68 is serially connected to a source of D. C. potential, as indicated by a battery. It is seen that when the protective relay 33a is operating normally, the contacts 66a and 35a will be open, thereby preventing the flow of current through the solenoid winding. A biasing spring 70 maintains a plunger 69 in a retracted position. It is seen that if the relay 33a becomes inoperative, by the application of a lowered reference potential, the protective relay will become inoperative and the arm 34a will move away from the contact 36a. The circuit between the contacts 35a and 66 will then be closed. This closed circuit permits current to flow in the solenoid winding, thereby attracting the plunger to move a rejector 71. The rejector is placed in a position relative to the conveyor belt so that it will push off any packages passing when the rejector is actuated. The reject device here illustrated will become operative when the reference potential across the protective relay is low due to improper spacing of the packages on the conveyor belt or due to any fault in the equipment that will prevent the reset operation from restoring the reference potential from its lower value to its higher value.

A second reject device comprises a solenoid winding 72 serially connected with a battery. Under normal operating conditions, the reject relay 25a is inoperative and the contacts 28a and 67a are open. Under these conditions, no current will flow in the solenoid winding 72, and a biasing spring 90 maintains a plunger 89 in a retracted position. If the reject relay is connected to a high source of reference potential, as may result when no pulse output is applied to the thyratron, due to the absence of metal, current will flow through the reject relay. This current attracts the arm 26a to close the contacts 28a and 67a, thereby closing the D. C. circuit to permit current to flow in the solenoid winding 72. Current through the solenoid winding attracts the plunger and moves a rejector 74. Again, as in the case of the first rejector, the second rejector is placed relatively to the belt to push off any package passing when the rejector is operated.

Figure 4:
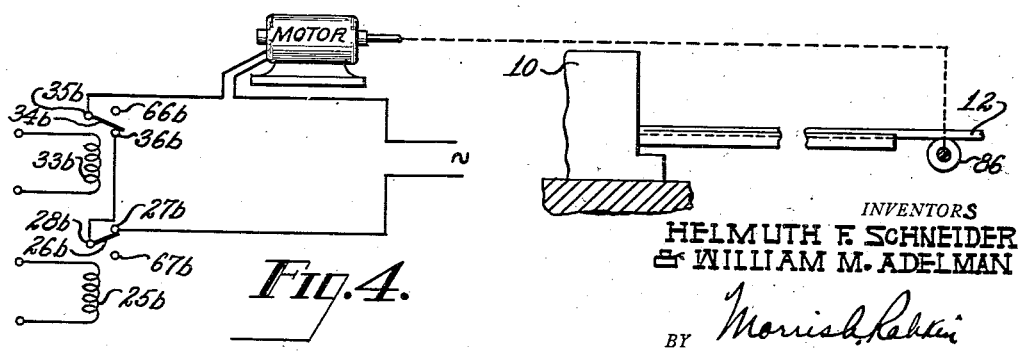
Figure 4 is a schematic showing of another form of control means.

Referring particularly to Figure 4, the control means previously mentioned in connection with Figure 1, is shown as a means to operate a motor to move the conveyor belt. The current through the protective relay 33b normally attracts the arm 34b to maintain the contacts 35b and 36b in a closed position. At the same time, a reject relay 25b is normally inoperative and the contacts 28b and 27b are normally closed.

It is seen that when the contact arms 26b and 34b are in the positions for normal operation of the system, the motor will be operatively connected to a source of power, as indicated. When the protective relay 33b becomes inoperative, due to a low reference potential on the plate of the thyratron applied thereto, the contact arm 34b will move away from the contact 36b. The operating power to the motor is, therefore, cut off and the conveyor belt moved by a roller 86 driven by the motor is stopped.

Likewise, if the reject relay 25b is connected to a high source of reference potential, as may result when no pulse output is applied to the thyratron, due to the absence of metal in the package, current will flow through the reject relay. Contact arm 26b is therefore withdrawn from the contact 27b, disconnecting the motor from the source of power, and stopping the conveyor belt.

It is seen in this embodiment of the invention that each of the relays must be in its normal position to permit movement of the conveyor belt.

It is seen from the foregoing description that a novel metal detection device has been invented. This device overcomes the difficulties experienced in prior art devices in that it provides a novel metal detector device which differentiates between the absence of metal in a package and no package at all.

There has been provided by this invention a relatively simple and inexpensive metal detector which searches for the absence of metals. Reject relays and their associated circuitry are not in continuous operation as in the case of prior art devices employed for the same purpose. Therefore, the useful life of the reject relays is greatly enhanced by the use of this invention.

The present invention has provided a new and improved metal detector which will automatically stop the conveyor if the spacing between the packages is less than a minimum required distance. This overcomes a defect found in some prior metal detectors, wherein spacing of the packages below a required minimum often resulted in passing packages uninspected.

What is claimed is:

1. In combination, a metal detector, a conveyor for moving work pieces past said metal detector, means coupled to said metal detector for producing an electrical impulse in response to a metallic body in a work piece moving past said metal detector, means coupled to said impulse producing means operative to provide a voltage output changeable from a high voltage value to a relatively low voltage value on occurrence of said impulse, a relay, a pair of contacts normally assuming a circuit opening position operatively associated with said relay, a normally open switch, said relay being connected to said voltage output providing means through said switch, said contacts being positionable into a circuit closing position upon energization of said relay, means for closing said switch disposed to be engageable by a work piece moved from said metal detector to said switch, and means energized through a circuit including said relay contacts for removing a work piece failing to produce an electrical impulse from said conveyor.

2. In combination, a metal detector, a conveyor for moving work pieces past said metal detector, means coupled to said metal detector for producing an electrical impulse in response to a metallic body in a work piece moving past said metal detector, means coupled to said impulse producing means operative to normally provide a voltage output having a high voltage value and to provide a voltage output at a relatively low voltage value on occurence of said impulse, a relay, a pair of normally open contacts operatively associated with said relay, a normally open switch, said relay being connected to said voltage output providing means through said switch, said contacts being operable to closed position upon energization of said relay, means for closing said switch disposed to be engageable by a work piece moved from said metal detector to said switch, and means energized by operation of said relay contacts to the closed position through a circuit including said relay contacts for identifying a work piece failing to produce an electrical impulse.

3. In combination with a metal detector for receiving packages moving on a conveyor belt and providing a characteristic voltage output in response to the presence of metal therein, a source of variable reference potential, means coupled to said metal detector for varying said reference potential from an original value to a second value when said metal detector provides said characteristic voltage, means for ejecting packages from said belt, a relay for actuating said ejecting means, a switch operatively responsive to a package conveyed by said belt to connect said relay to said source of variable reference potential, and a reset switch included in said first-named means responsive to a package on said belt to return the reference potential value to said original value.

4. In combination with a metal detector for receiving packages moving on a conveyor belt and providing a characteristic voltage output in response to the presence of metal, a thyratron having a cathode, an anode and a control electrode, a load resistor, an anode voltage source connected to said anode through said load resistor, means for coupling said control electrode to said metal detector whereby said thyratron is caused to conduct when said metal detector provides said characteristic voltage, control means for rejecting packages from said belt on actuation thereof, a relay for actuating said control means, a switch operatively responsive to a package conveyed by said belt to connect said relay to said anode, and a reset switch spaced along said belt from said first-named switch that is operative in response to a package on said belt to disconnect said anode voltage source from said anode.

5. In combination with a metal detector for receiving packages carried by a conveyor belt and having means for producing a characteristic voltage in response to the presence of metal, a source of reference potential, means connected to said source of reference potential for changing said reference potential from a relatively fixed value to a lower value, means connected to said metal detector for applying the voltage output of said metal detector to said means for changing said reference potential to vary it from said fixed value to said lower value when said metal detector produces said characteristic voltage, means providing for the rejection of packages from said belt, a control circuit for operating said last-named means when closed, a protective relay operative to open said control circuit, a switch connected between said protective relay and said source of reference potential operatively responsive to a package carried by said belt to connect said protective relay to said source of reference potential, a second control circuit, a reject relay normally inoperative to close said second control circuit for operating said package rejecting means when closed, a second switch connected in a circuit between said rejection relay and said source of reference potential operatively responsive to a package conveyed by said belt to connect said reject relay to said source of reference potential, and a reset switch included in said first-named means responsive to a package on said conveyor belt to return reference potential to said fixed value.

6. In combination with a metal detector for responding to the presence of metal by producing a characteristic voltage and having inlet and outlet apertures for receiving a package carried by a conveyor belt, a source of reference potential, means connected to said source for changing said reference potential from a relatively fixed value to a lower value, circuit means connected to said metal detector for applying the characteristic voltage of said metal detector to change said reference potential from said fixed value to said lower value, a package rejection device mounted adjacent to said belt near said inlet aperture, a control means for controlling the operation of said device, a protective relay to actuate said control means, a switch operatively responsive to a package carried by said belt to connect said protective relay to said source of reference potential, said switch being disposed to be responsive to the presence of a package prior to its entrance into said inlet aperture, a second package rejection device mounted near said outlet aperture, a second control means for controlling the operation of said second device, a reject relay to actuate said second control means, a second switch operatively responsive to a package conveyed by said belt to connect said reject relay to said source of reference potential, said second switch being disposed to be responsive after the exit of said package from said outlet aperture, and a reset switch connected between said source of reference potential and said first-named means to return the reference potential to said fixed value, said reset switch being disposed to be operatively responsive to a package following package actuated response of said second switch.

7. In combination with a metal detector for receiving packages moving on a conveyor belt and providing a positive voltage pulse in response to the presence of metal, a resistor, means connected in series with said resistor for controlling the current therethrough, means connected to said metal detector for applying said voltage pulse to said last-named means whereby said current varies from an original value to a second value when said metal detector provides said voltage pulse, means for controlling the operation of said conveyor belt, a relay for actuating said controlling means, a switch operatively responsive to a package conveyed by said belt to connect said relay to said resistor, and a reset switch included in said first-named means responsive to a package on said belt to return said control through said resistor to said original value.

8. In combination, an inspection station, a conveyor for moving work pieces past said inspection station, said station including means for producing an electrical impulse in response to a body having predetermined permeability characteristics in a work piece moving past said station, means coupled to said impulse producing means operative to normally provide a voltage output having a high voltage value and to provide a voltage output at a relatively low voltage value on occurrence of said impulse, a relay, a pair of normally open contacts operatively associated with said relay, a normally open switch, said relay being connected to said voltage output providing means through said switch, said contacts being operable to closed position upon energization of said relay, means for closing said switch disposed to be engageable by a work piece moving from said inspection station to said switch, and means energized by the operation of said relay contacts to the closed position through a circuit including said relay contacts for identifying a work piece failing to produce an electrical impulse.

References Cited in the file of this patent

UNITED STATES PATENTS

| | | |
|---|---|---|
| 2,237,254 | Brockhuysen | Apr. 1, 1941 |
| 2,393,188 | Reynolds | Jan. 15, 1946 |
| 2,620,923 | Williams | Dec. 9, 1952 |
| 2,660,304 | Box et al. | Nov. 24, 1953 |